(12) United States Patent
Mayer

(10) Patent No.: US 7,549,189 B1
(45) Date of Patent: Jun. 23, 2009

(54) SELF-CLEANING WIPER BLADE SYSTEM FOR VEHICLES

(76) Inventor: Matthew D. Mayer, 211 N. Lincoln Ave. #6, P.O. Box 1041, Oak Creek, CO (US) 80467

( * ) Notice: Subject to any disclaimer, the term of this patent is extended or adjusted under 35 U.S.C. 154(b) by 819 days.

(21) Appl. No.: 10/938,598

(22) Filed: Sep. 13, 2004

(51) Int. Cl.
*B60S 1/32* (2006.01)
*B60S 1/34* (2006.01)

(52) U.S. Cl. .............................. 15/250.19; 15/250.351; 15/250.352

(58) Field of Classification Search ............ 15/250.019, 15/250.001, 250.351, 250.202, 250.203, 15/250.352
See application file for complete search history.

(56) References Cited

U.S. PATENT DOCUMENTS

| | | | | |
|---|---|---|---|---|
| 2,784,438 | A | * | 3/1957 | Petersen ................... 15/250.19 |
| D341,561 | S | | 11/1993 | Heckman et al. |
| 5,469,595 | A | | 11/1995 | Dara |
| 5,487,204 | A | * | 1/1996 | Nelson ..................... 15/250.19 |
| 5,551,116 | A | | 9/1996 | DeKelaita |
| 5,749,119 | A | | 5/1998 | Isaac |
| 6,129,093 | A | | 10/2000 | Kelly |
| 6,471,784 | B2 | | 10/2002 | Lahti |
| 6,622,338 | B1 | * | 9/2003 | Chen et al. ................ 15/250.19 |
| 2004/0068821 | A1 | * | 4/2004 | Genick et al. ............. 15/250.19 |
| 2004/0128787 | A1 | * | 7/2004 | Wagner .................... 15/250.19 |

FOREIGN PATENT DOCUMENTS

| | | | |
|---|---|---|---|
| DE | 3731921 | * | 12/1988 |
| JP | 58-139847 | * | 8/1983 |
| JP | 04-085150 | * | 3/1992 |

\* cited by examiner

*Primary Examiner*—Gary K Graham

(57) ABSTRACT

A system includes a plurality of wiper blades including U-shaped housings and elongated lever arms having lower end portions connected thereto respectively. The housings are secured to a lower portion of the windshield and electrically coupled to an internal power supply source. A hand-operable switch is disposed within the vehicle and operably connected to the power supply source and the housings respectively. The system further includes a mechanism electrically coupled to the switch for lifting the wiper blades about the respective housing, effectively generating an impact force as the wiper blades are snapped back to the resting position after being pivoted to a stressed position so that debris and frozen elements will advantageously discharge from the wiper blades during operating conditions.

1 Claim, 6 Drawing Sheets

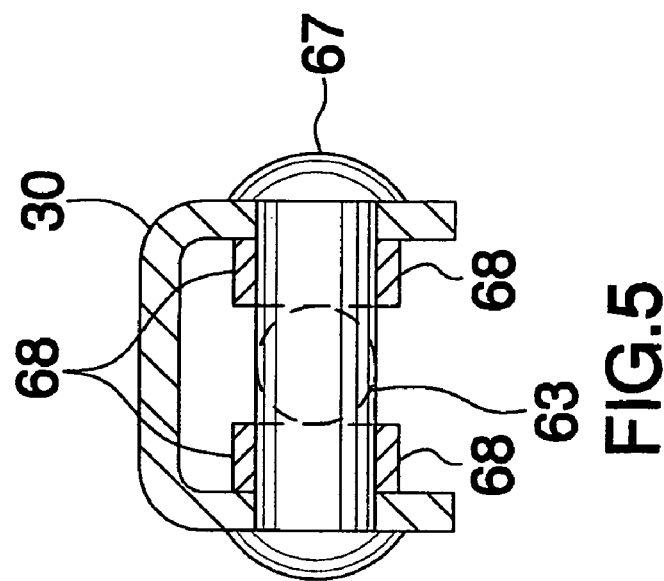
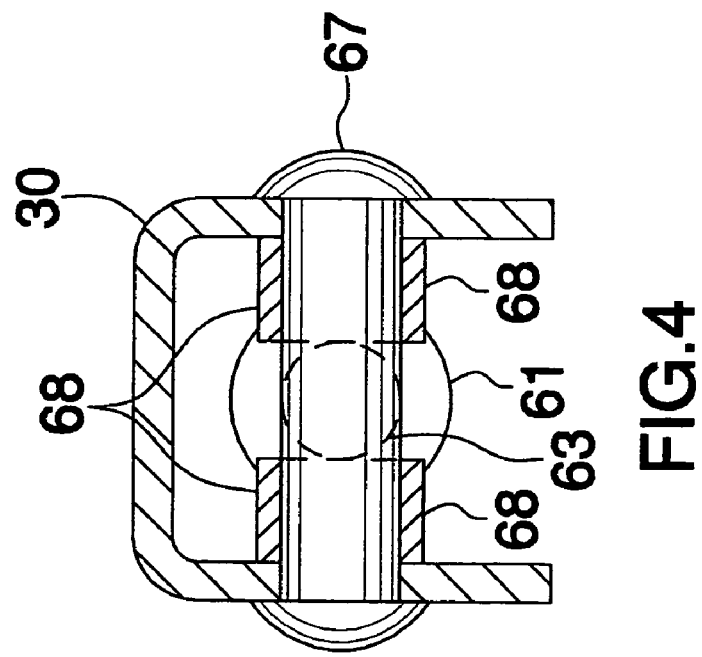

SELF-CLEANING WIPER BLADE SYSTEM FOR VEHICLES

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to a cleaning system and, more particularly, to a self-cleaning wiper blade system for vehicles.

2. Prior Art

Virtually all vehicles today (cars, trucks, trains, airplanes, boats etc) incorporate one or more windshield wipers which can be activated at any time by a driver to sweep repeatedly across an exterior surface of the windshield. A rubber or plastic wiper blade of each wiper assembly engages the exterior surface to clear debris from that portion of the windshield generally in front of the driver to maintain unimpaired visibility. Debris left to build up on the windshield impairs visibility for the driver and if permitted to build up anywhere on the wiper assembly can also reduce wiping efficiency. Maintaining good visibility for the driver lessens the likelihood of the vehicle becoming involved in an accident and hence increases the safety level for all occupants.

A problem frequently encountered by motorist is the collection of sleet, ice, or snow on a wiper blade. As long as the frozen mass remains merely trapped, the efficiency of the wiper blade is severely reduced as a significant portion or all of the wiper blade can no longer engage the exterior surface of the windshield. The thickness of this frozen mass may have a bearing on the wiping efficiency especially if the mass extends along a significant length of the blade. Ice lumps as small as one millimeter if so trapped can cause the wiper to experience reduced efficiency. Snow and/or ice formation anywhere on the windshield wiper assembly may contribute to reducing wiping efficiency also by raising sections of the blade off the windshield.

Numerous windshield wiper cleaning devices have been provided in prior art. Usually, the removal of sleet, ice, or snow requires the driver to stop and knock thereof off the wiper blade by hand. Some big semi-truck drivers will have to pull out a ladder and climb on the hood to clean the wiper blades. Some drivers will try to knock-off the sleet, ice, or snow while driving and other drivers will tolerate an obstructed windshield; either scenario creates a driving hazard.

Accordingly, a need remains for a self-cleaning wiper blade system for vehicles in order to overcome the above-noted shortcomings. The present invention satisfies such a need by providing a cleaning system that is easy to use, easily installed, convenient for use and increases driver safety. Such a cleaning system prevents repetitive stopping during travel to clean the vehicle's wiper blades, thus saving time and effort and resulting in shorter and safer travels. The cleaning system advantageously enables a driver to maintain focus on the road and concentrate on traffic flow while also providing optimum visibility to the driver. Advantageously, the system can be adapted to a variety of vehicles, thus providing safety to more people.

BRIEF SUMMARY OF THE INVENTION

In view of the foregoing background, it is therefore an object of the present invention to provide a system for a self-cleaning wiper blade. These and other objects, features, and advantages of the invention are provided by a system for cleaning foreign debris and frozen elements from a vehicle's windshield.

The system includes a plurality of wiper blades including a plurality of substantially U-shaped housings and a plurality of elongated lever arms having lower end portions pivotally connected thereto respectively. Such housings are secured to a lower portion of the windshield and electrically coupled to an internal power supply source located within the vehicle.

A hand-operable switch is disposed within the vehicle and operably connected to the power supply source and the housings respectively so that a user can conveniently control the wiper blades without exiting the vehicle during operating conditions.

The system further includes a mechanism for lifting the wiper blades about the respective housings wherein the wiper blades are caused to pivot outwardly and away from the windshield along a selected arcuate path defined between rested and stressed positions respectively. Such a lifting mechanism effectively generates an impact force as the wiper blades are snapped back to the resting position after being pivoted to a stressed position so that the debris and frozen elements will advantageously discharge from the wiper blades during operating conditions. The lifting mechanism is electrically coupled to the switch.

The lifting mechanism preferably includes a plurality of solenoids including a wire coil disposed along a cylindrical path for carrying a current to define a magnetic force. A conductive piston is disposed within the solenoid and medially of the coil wherein the piston is movable along a rectilinear path medially through the coil when a current flows thereto. Such a piston is selectively positionable between extended and retracted positions corresponding to the wiper blade stressed and resting positions respectively. The pistons preferably have opposed end portions secured to the solenoids and a selected portion of the lever arms for generating sufficient torque respectively and for pivoting the wiper blades outwardly and away from the windshield.

The lifting mechanism preferably further includes a plurality of helical springs that have opposed end portions connected to the housings and corresponding ones of the lever arms respectively wherein the helical springs are disposed adjacent to the solenoids respectively. Such helical springs are resiliently deformable between stretched and compressed positions when the pistons are selectively toggled between the extended and retracted positions respectively. The helical springs cooperate with the corresponding solenoids conveniently causing the wiper blades to return to the resting positions during operating conditions.

The lifting mechanism may further include a plurality of integrally disposed base members secured to the solenoids and the associated pistons respectively. Such base members extend substantially orthogonally to the pistons for effectively anchoring the lifting mechanism to the wiper blades respectively. A plurality of spacers is connected about the base members for assisting to maintain the pistons along the respective rectilinear paths during operating conditions.

In an alternate embodiment, the lifting mechanism may include a plurality of motors positioned adjacent to the housings including a plurality of cams slidably engageable with the lever arms respectively. Such cams are rotatable about clockwise and counterclockwise positions along a predetermined plane for causing the wiper blades to become detached from the windshield as the cams are passed along a selected quadrant respectively.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 4 is a cross-sectional view of the system shown in FIG. 3, taken along line 4-4;

FIG. 5 is a cross-sectional view of the system shown in FIG. 3, taken along line 5-5;

DETAILED DESCRIPTION OF THE INVENTION

Figure 1:
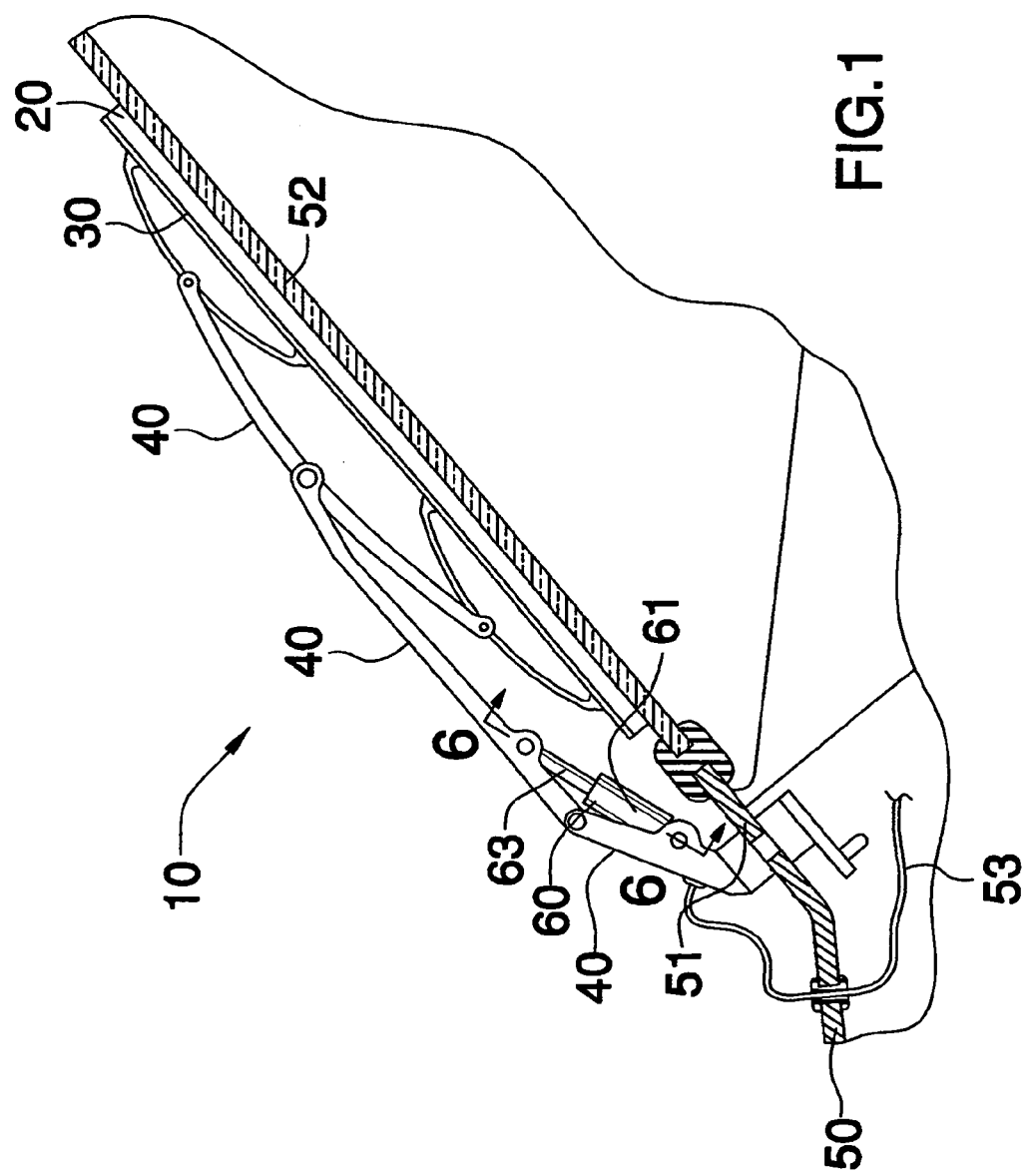
FIG. 1 is a side elevational view showing a self-cleaning wiper blade system from vehicles, in accordance with the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this application will be thorough and complete, and will fully convey the true scope of the invention to those skilled in the art. Like numbers refer to like elements throughout the figures and prime and double prime numbers refer to alternate embodiments of such elements.

The system of this invention is referred to generally in FIGS. 1-7 by the reference numeral 10 and is intended to provide a self-cleaning wiper blade system for a vehicle. It should be understood that the apparatus 10 may be used to clean many different types of vehicle windows and should not be limited to use in only automobiles.

Referring initially to FIG. 1, the system 10 includes a plurality of wiper blades 20 including a plurality of substantially U-shaped housings 40 and a plurality of elongated lever arms 30 having lower end portions 21 pivotally connected thereto respectively. Such housings 40 are secured to a lower portion 51 of the windshield 52 and electrically coupled to an internal power supply source 53 located within the vehicle 50. The system 10 can advantageously be installed after the purchase of a vehicle or may, of course, be installed as a permanent safety feature in newly designed and produced vehicles.

Still referring to FIG. 1, a hand-operable switch (not shown) is disposed within the vehicle 50 and operably connected to the power supply source 53 and the housings 40 respectively so that a user can conveniently control the wiper blades 20 without exiting the vehicle 50 during operating conditions. This feature advantageously eliminates the need to cease driving operations for the purpose of cleaning the wiper blades 20 during inclement weather.

Figure 2:
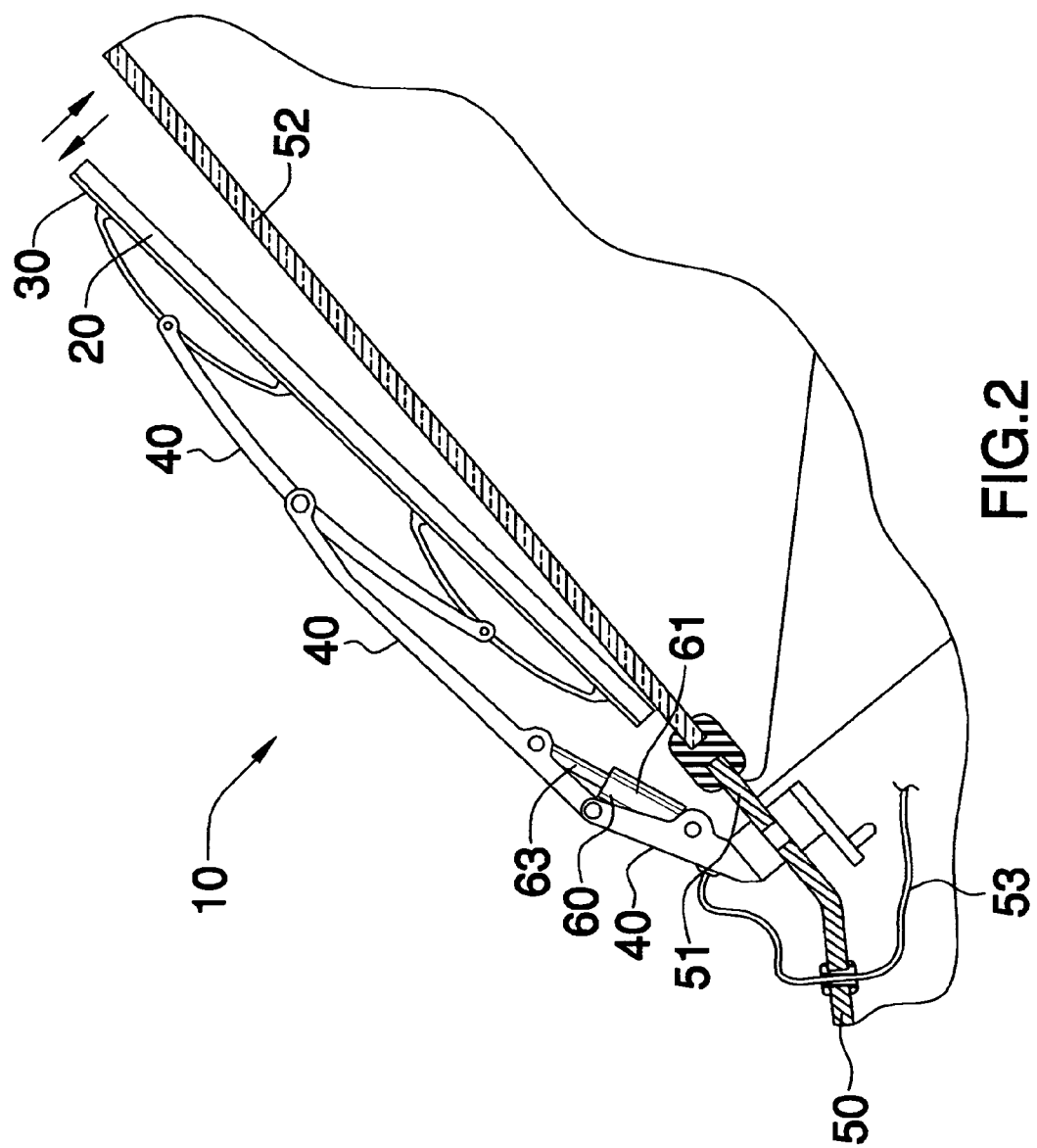
FIG. 2 is a side elevational view showing the system in FIG. 1 during operating conditions.

Referring to FIG. 2, the system 10 further includes a mechanism 60 for lifting the wiper blades 20 about the respective housings 40 wherein the wiper blades 20 are caused to pivot outwardly and away from the windshield 52 along a selected arcuate path defined between rested and stressed positions respectively. Such a lifting mechanism 60 effectively generates an impact force as the wiper blades 20 are snapped back to the resting position after being pivoted to a stressed position so that the debris (not shown) and frozen elements (not shown) will advantageously discharge from the wiper blades 20 during operating conditions, again eliminating the need to cease driving to manually clean the wiper blades 20. This feature also reduces the temptation to try to remove debris while driving a vehicle, thus increasing the safety of both the driver and other vehicle occupants. The lifting mechanism 60 is electrically coupled to the switch.

Figure 3:
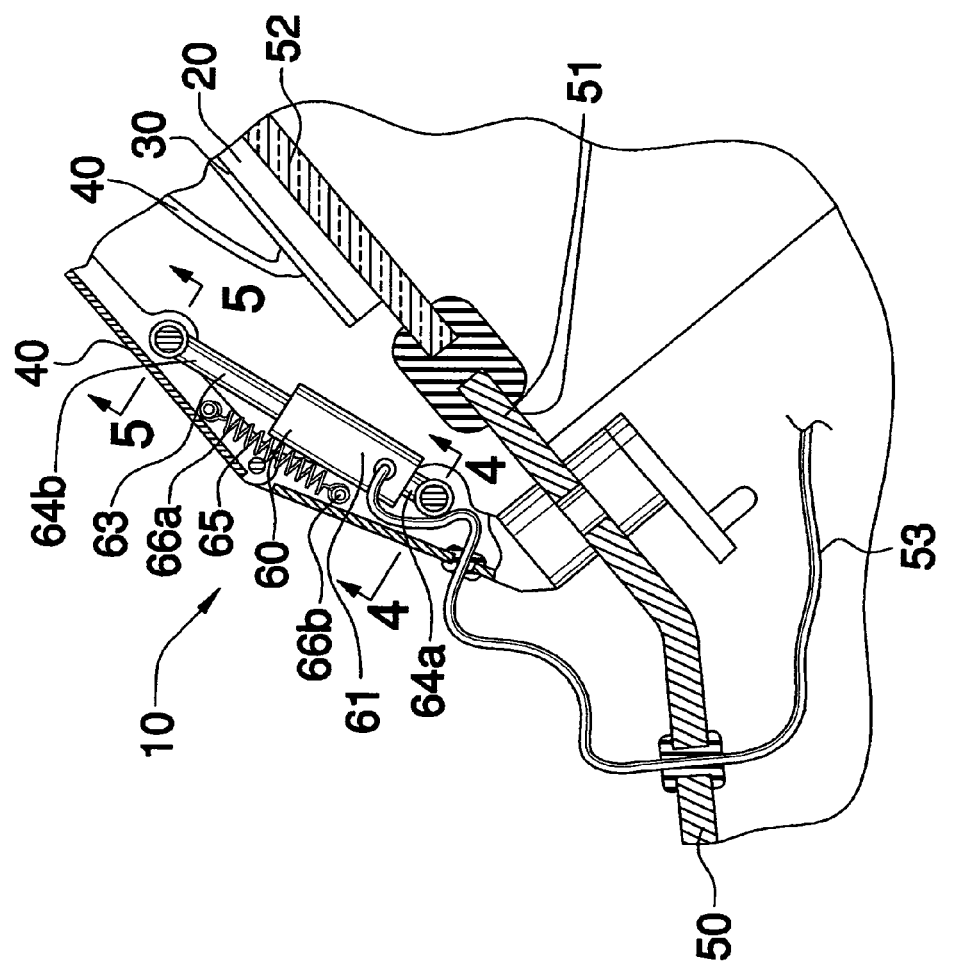
FIG. 3 is an enlarged side elevational view of the lifting mechanism shown in FIG. 1.
Figure 6:
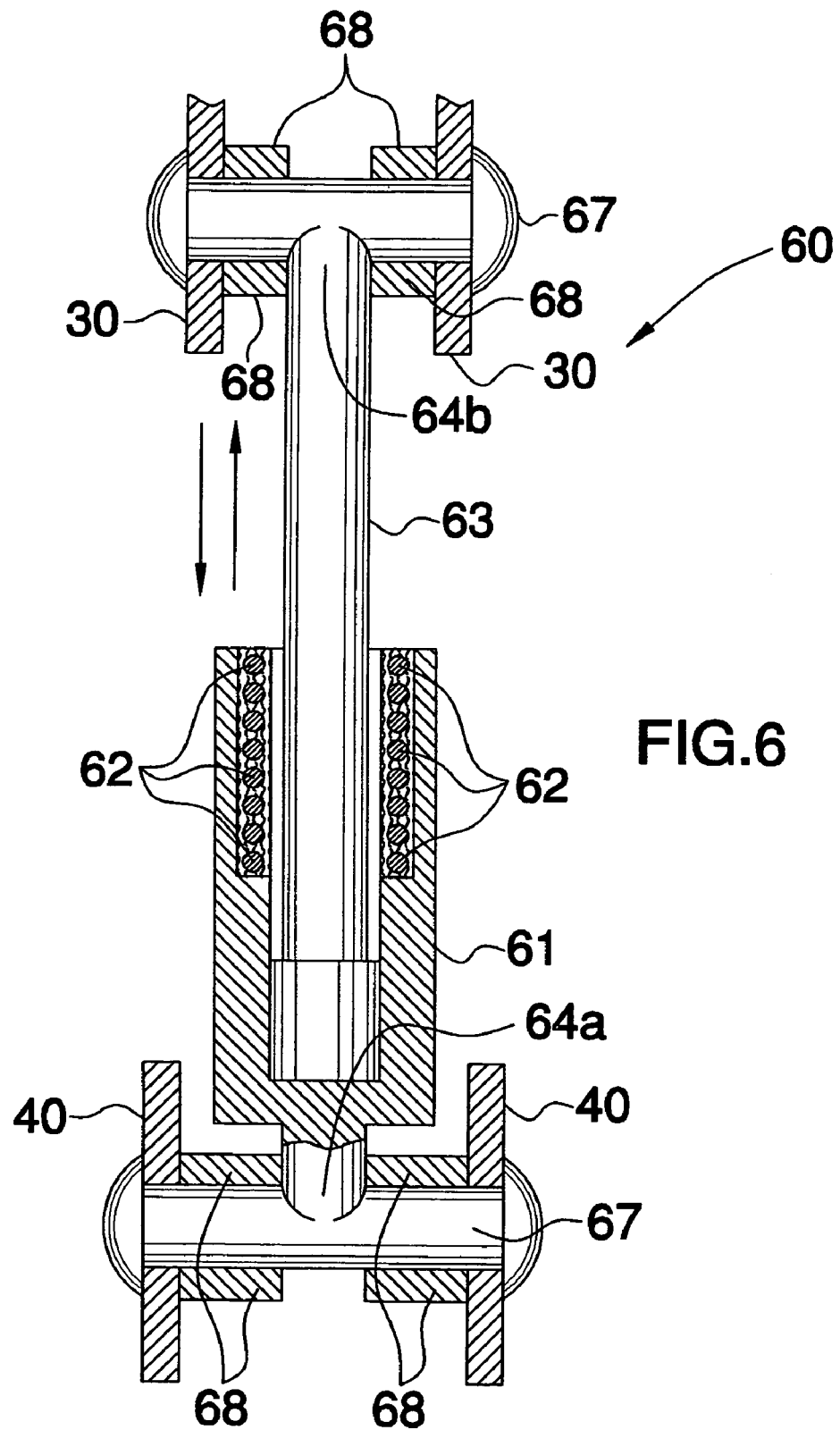
FIG. 6 is a cross-sectional view of the system shown in FIG. 1, taken along line 6-6.

Referring to FIGS. 3 and 6, the lifting mechanism 60 includes a plurality of solenoids 61 including a wire coil 62 disposed along a cylindrical path for carrying a current to define a magnetic force. A conductive piston 63 is disposed within the solenoid 61 and medially of the coil 62 wherein the piston 63 is movable along a rectilinear path medially through the coil 62 when a current flows thereto. Such a piston 63 is selectively positionable between extended and retracted positions corresponding to the wiper blade 20 stressed and resting positions respectively. The pistons 63 have opposed end portions 64a, b secured to the solenoids 61 and a selected portion of the lever arms 40 for generating sufficient torque respectively and for pivoting the wiper blades 20 outwardly and away from the windshield 52.

Referring to FIG. 3, the lifting mechanism 60 further includes a plurality of helical springs 65 that have opposed end portions 66a, b connected to the housings 40 and corresponding ones of the lever arms 30 respectively wherein the helical springs 65 are disposed adjacent to the solenoids 61 respectively. Such helical springs 65 are resiliently deformable between stretched and compressed positions when the pistons 63 are selectively toggled between the extended and retracted positions respectively. The helical springs 65 cooperate with the corresponding solenoids 61, conveniently causing the wiper blades 20 to return to the resting position during operating conditions. This advantageously allows the wiper blades 20 to resume their normal function during non-operating conditions of the system 10, thus allowing for better visibility and increased safety during driving conditions.

Referring to FIGS. 4 and 5, the lifting mechanism 60 further includes a plurality of integrally disposed base members 67 secured to the solenoids 61 and the associated pistons 63 respectively. Such base members 67 extend substantially orthogonally to the pistons 63 for effectively anchoring the lifting mechanism 60 to the wiper blades respectively, ensuring the continual proper functioning thereof. A plurality of spacers 68 is connected about the base members 67 for assisting to maintain the pistons 63 along the respective rectilinear paths during operating conditions, advantageously preventing the pistons from damaging the housing 40 and lever arm 30 during operating conditions due to excessive mechanical stress.

Figure 7:
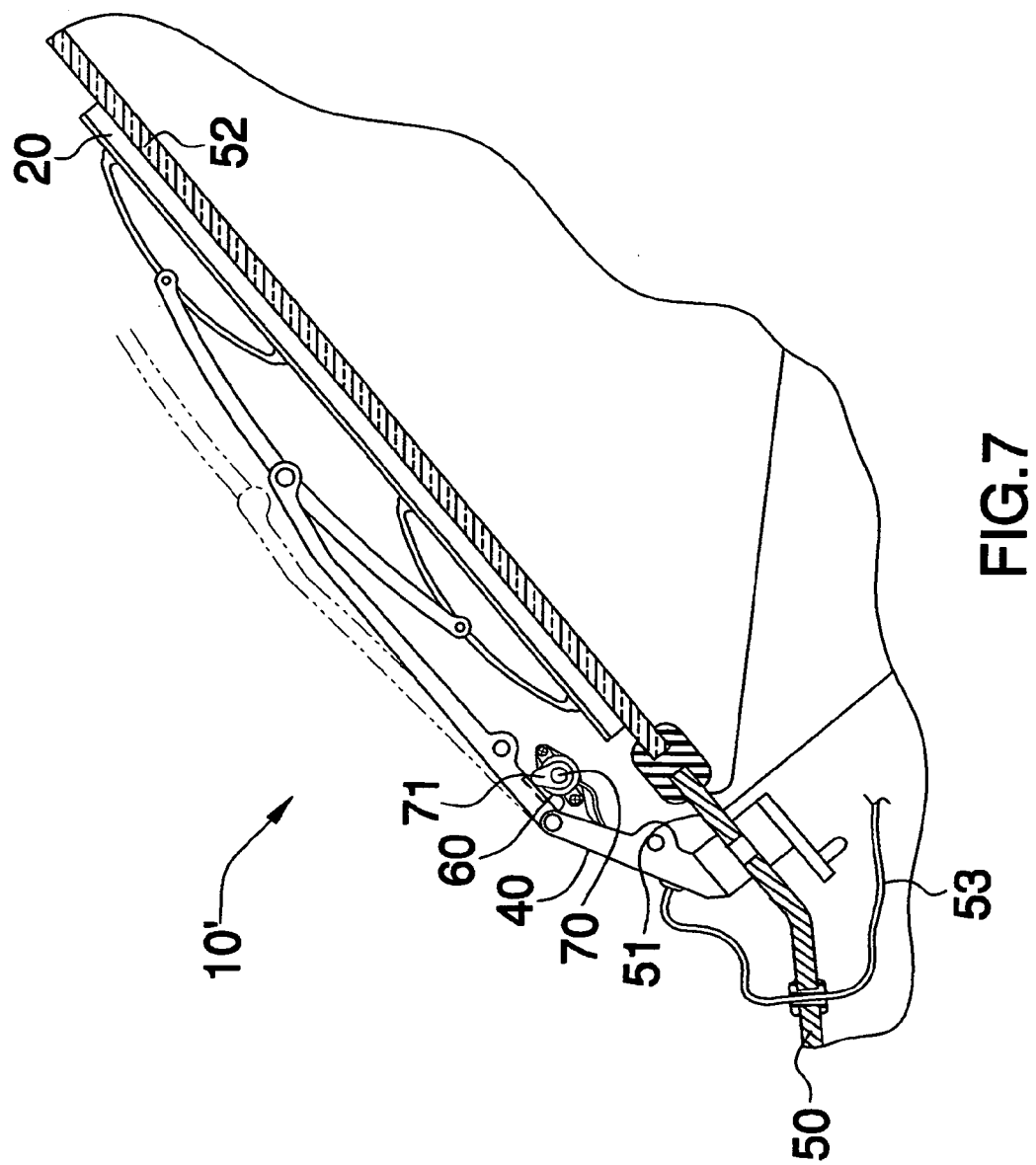
FIG. 7 is a side elevational view of the system showing an alternate embodiment of the lifting mechanism.

Referring to FIG. 7, in an alternate embodiment 10', the lifting mechanism 60 includes a plurality of motors 70 positioned adjacent to the housings 40 including a plurality of cams 71 slidably engageable with the lever arms 30 respectively. Such cams 71 are rotatable about clockwise and counterclockwise positions along a predetermined plane for causing the wiper blades 20 to become detached from the windshield 52 as the cams 71 are passed along a selected quadrant respectively.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed is:

1. A system for cleaning foreign debris and frozen elements from a vehicle's windshield, said system comprising:
    a plurality of wiper blades;
    a plurality of elongated lever arms having lower end portions pivotally connected to said wiper blades respectively;
    a plurality of substantially U-shaped housings wherein said lever arms are pivotally supported by said housings respectively;
    said housings being secured to a lower portion of the windshield;
    a hand-operable switch disposed within the vehicle and operably connected to an internal power supply source located within the vehicle; and
    means for lifting said wiper blades about said respective housings wherein said wiper blades are caused to pivot outwardly and away from the windshield along a selected arcuate path defined between rested and stressed positions respectively, said lifting means for generating an impact force as said wiper blades are snapped back to the resting position after being pivoted to a stressed position so that the debris and frozen elements will discharge from said wiper blades during operating conditions, said lifting means being electrically coupled to said switch so that a user can control said wiper blades without exiting the vehicle during operating conditions;
    wherein said lifting means comprises
    a plurality of solenoids comprising
    a wire coil disposed along a cylindrical path for carrying a current to define a magnetic force,
    a conductive piston disposed medially of said coil wherein said piston is movable along a rectilinear path medially through said coil when a current flows thereto, said piston being selectively positionable between extended and retracted positions corresponding to said wiper blade stressed and resting positions respectively;
    a plurality of integrally disposed base members secured to said solenoids and said associated pistons respectively, said base members extending substantially orthogonally to said pistons for anchoring said lifting means to said wiper blades respectively;
    a plurality of spacers connected about said base members for assisting to maintain said pistons along the respective rectilinear paths during operating conditions; and
    a plurality of helical springs having opposed end portions connected to said housings and corresponding ones of said lever arms respectively wherein said helical springs are disposed adjacent to said solenoids respectively, said helical springs being resiliently deformable between stretched and compressed positions when said pistons are selectively toggled between the extended and retracted positions respectively, said helical springs for cooperating with said corresponding solenoids and causing said wiper blades to return to the resting positions during operating conditions;
    wherein said pistons have opposed end portions statically secured directly to said base members for generating sufficient torque to respectively pivot said wiper blades outwardly and away from the windshield;
    wherein said opposed end portions of said pistons are simultaneously disposed exterior of said solenoids respectively;
    wherein said solenoids are positioned below said lever arms such that a spatial distance between the windshield and said solenoids is less than a spatial distance between the windshield and said lever arms respectively;
    wherein said helical spring members are positioned above said pistons such that a spatial distance between the windshield and said helical spring members is greater than a spatial distance between the windshield and said pistons respectively.

* * * * *